Sept. 13, 1932.  A. A. RUPPERT  1,877,055
SEAT CUSHION
Filed Oct. 31, 1930
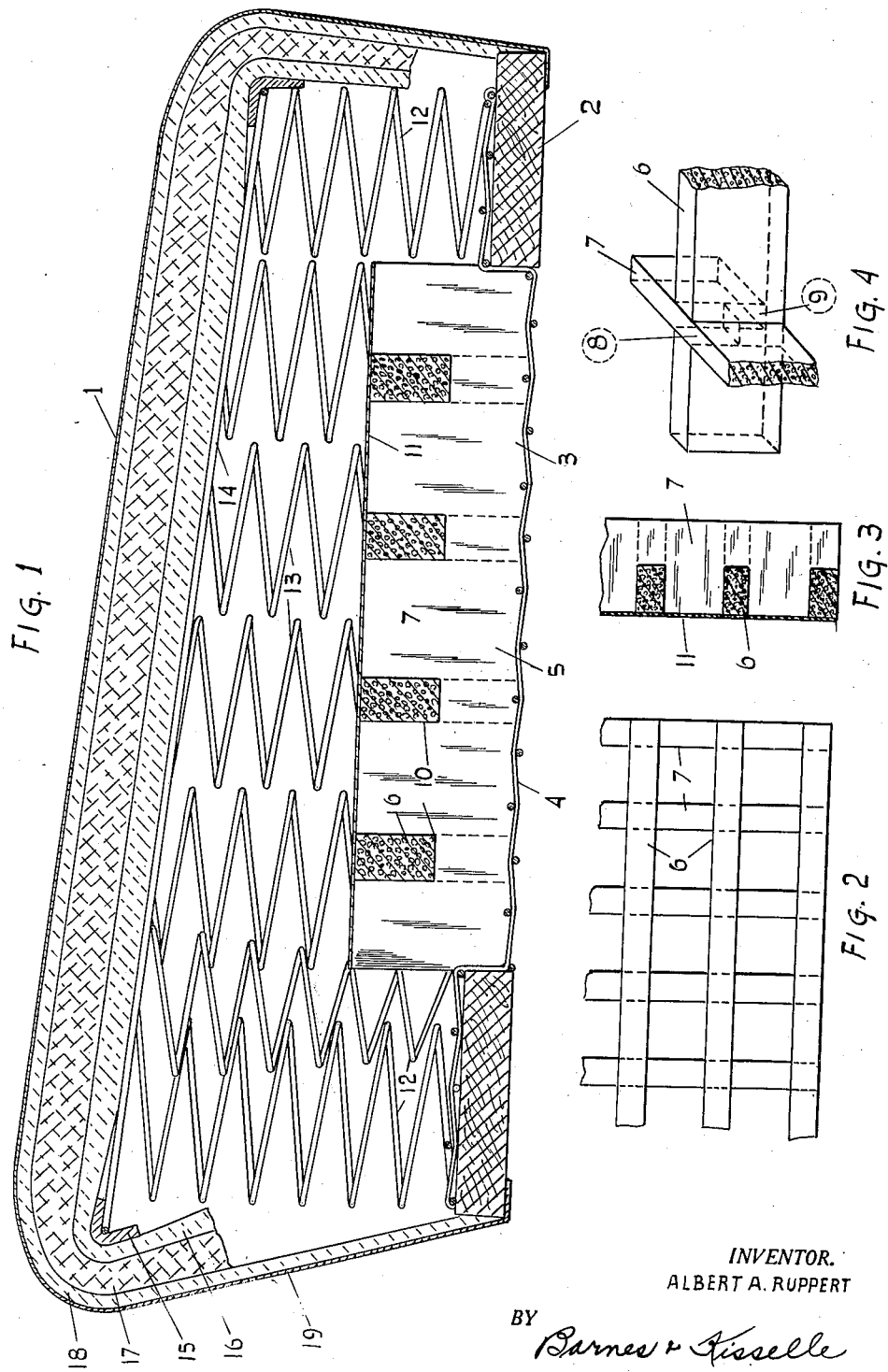
INVENTOR.
ALBERT A. RUPPERT
BY
Barnes & Kisselle
ATTORNEYS.

Patented Sept. 13, 1932

1,877,055

UNITED STATES PATENT OFFICE

ALBERT A. RUPPERT, OF PLEASANT RIDGE, MICHIGAN, ASSIGNOR TO GENERAL MOTORS CORPORATION, OF DETROIT, MICHIGAN, A CORPORATION OF DELAWARE

SEAT CUSHION

Application filed October 31, 1930. Serial No. 492,490.

This invention relates to a seat cushion and more particularly a seat cushion adapted for an automotive vehicle.

It is an object of this invention to produce a seat cushion that permits of great riding comfort owing to the sensitivity of its resilient cushioning effect and its come-back qualities. This has been achieved by a combination of coil springs and sponge rubber in the fabrication of the seat cushion assembly.

In the drawing:

Fig. 1 is a cross-sectional view of a seat cushion.

Figs. 2 and 3 are fragmentary views showing the sponge rubber portion of the seat cushion assembly.

Fig. 4 is a fragmentary elevation showing the specific type of joint used in the sponge rubber portion of the seat cushion.

Referring more particularly to the drawing, the seat cushion may be generally referenced 1. The seat cushion 1 is provided on the underside thereof with a frame 2 which forms an opening 3. The opening 3 is covered by a wire mesh 4, which wire mesh overlaps the upper face of the seat frame 2 and may be secured to the seat frame by any suitable means. The portion of the wire mesh 4 covering the opening 3 serves as a support for a sponge rubber assembly which may be generally referenced 5. The portion of the wire mesh which serves as a support for the sponge rubber is stretched taut across the opening 3 and is yieldable to a certain extent.

The sponge rubber assembly 5 is in the form of a lattice comprising a plurality of parallel longitudinal strips 6 of sponge rubber and a plurality of transverse parallel strips of sponge rubber 7. This lattice of sponge rubber may be moulded as an integral whole, but preferably consists of a plurality of strips cemented together. The strips 6 and 7 are preferably crossed at right angles to each other and consequently the strips 6 are recessed as at 8 and the strips 7 as at 9. The recessed portions of the strips 6 and 7 are interfitted to form the joints 10. The joints 10 are cemented together by any suitable rubber cement. The upper face of the sponge rubber assembly has cemented or otherwise suitably secured thereto the cloth 11. This sponge rubber assembly is supported by the wire mesh 4 which covers the opening 3 within the seat frame 2.

The seat frame has mounted thereon a plurality of coil springs 12 and the sponge rubber assembly has mounted thereon a plurality of coil springs 13. The coil springs 12 have a greater number of convolutions than the coil springs 13. The upper ends of the coil springs are secured in the well-known manner to the upper wire seat frame 14. The coil spring assembly is then upholstered. This upholstery consists of the corner pad 15, the cotton pad 16, the wool pad 17 which covers the cotton pad 16, and wadding 18. The wadding and the several pads are covered by, and fastened to, the trim cloth 19 which in turn is secured to the seat frame 2.

From the above description it is evident that there is here produced a seat cushion, the cushioning quality of which is effected by the combination of the spring cushioning qualities of coil springs and sponge rubber.

I claim:

1. A seat cushion for an automotive vehicle or the like comprising in combination a plurality of coil springs, a sponge rubber portion arranged to support a part of the coil springs and a cover for the said coil spring and sponge rubber assembly.

2. A seat cushion for an automotive vehicle or the like comprising in combination a seat frame forming an opening, a web covering the said opening, sponge rubber mounted on the said web, a plurality of coil springs a part of which are supported by the said sponge rubber, and a covering for the said coil spring and sponge rubber assembly.

3. A seat cushion for an automotive vehicle or the like comprising in combination a seat frame forming an opening, a wire mesh covering the said opening, a sponge rubber lattice mounted on the said web, a plurality of coil springs a portion of which are supported by the said sponge rubber lattice, and a covering for the said coil spring and sponge rubber assembly.

4. A seat cushion for an automotive vehicle or the like comprising a seat frame, a sponge rubber lattice mounted on the said seat frame, a cloth secured to the upper face of the sponge rubber lattice, a plurality of coil springs mounted on the said sponge rubber lattice and seat frame, and a covering for the said coil spring and sponge rubber assembly.

5. A seat cushion for an automotive vehicle or the like comprising in combination a seat frame forming an opening, a web covering the said opening, a sponge rubber lattice comprising a plurality of crossed sponge rubber strips mounted on the said web, a plurality of coil springs carried by the said sponge rubber lattice and frame, and a covering for the said coil springs and the sponge rubber assembly.

6. A seat cushion for an automotive vehicle or the like comprising a seat frame, a sponge rubber lattice comprising a plurality of crossed sponge rubber strips mounted on the seat frame, a plurality of coil springs mounted on the said sponge rubber lattice, and a covering for the said coil spring and sponge rubber assembly.

7. A seat cushion for an automotive vehicle or the like comprising in combination a seat frame, a sponge rubber lattice mounted on the said frame, said lattice comprising a plurality of articulated sponge rubber strips, a cloth secured to the upper face of the said sponge rubber lattice, a plurality of coil springs mounted on the said sponge rubber lattice and seat frame, and a cover for the said coil spring and sponge rubber assembly.

In testimony whereof I affix my signature.

ALBERT A. RUPPERT.